United States Patent
Ohno et al.

(10) Patent No.: US 9,533,651 B1
(45) Date of Patent: Jan. 3, 2017

(54) OCCUPANT PROTECTION DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Shinichi Ishida, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/177,993

(22) Filed: Jun. 9, 2016

(30) Foreign Application Priority Data

Jul. 13, 2015 (JP) ................. 2015-139494

(51) Int. Cl.
  *B60R 21/207* (2006.01)
  *B60N 2/427* (2006.01)
  *B60R 21/231* (2011.01)
  *B60R 21/0134* (2006.01)
  *B60R 22/46* (2006.01)
  *B60R 21/233* (2006.01)
  (Continued)

(52) U.S. Cl.
  CPC ......... *B60R 21/23138* (2013.01); *B60N 2/427* (2013.01); *B60N 2/4279* (2013.01); *B60N 2/42736* (2013.01); *B60R 21/0134* (2013.01); *B60R 21/207* (2013.01); *B60R 21/233* (2013.01); *B60R 22/46* (2013.01); *B60R 2021/0032* (2013.01); *B60R 2021/0048* (2013.01); *B60R 2021/0273* (2013.01); *B60R 2021/2074* (2013.01); *B60R 2021/23107* (2013.01); *B60R 2021/23146* (2013.01); *B60R 2021/23308* (2013.01)

(58) Field of Classification Search
  CPC ............ B60R 21/207; B60R 21/23138; B60R 2021/23146; B60R 2021/0048; B60R 2021/0273; B60R 2021/2074; B60N 2/427; B60N 2/42736; B60N 2/4279
  See application file for complete search history.

(56) References Cited

U.S. PATENT DOCUMENTS 3,753,576 A * 8/1973 Gorman ................ B60R 21/207
  280/730.1
3,953,049 A * 4/1976 Surace .................... B60R 21/08
  280/730.1

(Continued)

FOREIGN PATENT DOCUMENTS

JP  2000-344044 A  12/2000
JP  2013-018378 A  1/2013
WO  WO 2006044937 A2 *  4/2006  ......... B60N 2/42736

*Primary Examiner* — Barry Gooden, Jr.
(74) *Attorney, Agent, or Firm* — Oliff PLC

(57) ABSTRACT

An occupant protection device is provided including (1) an airbag that covers the head of the occupant, and that has (i) a front deployment section that is housed in a headrest, and that is deployed at a seat forward direction with respect to the head of a seated occupant, and (ii) a pair of left and right lateral deployment sections that are inflated and deployed at seat sides with respect to the head of the seated occupant, (2) a lifting mechanism that raises and lowers the vehicle seat, and (3) a controller that uses the lifting mechanism to lower the vehicle seat to an airbag deployable height in cases in which a vehicle collision has been determined to be unavoidable and a height of the vehicle seat is higher than the airbag deployable height, and that inflates and deploys the airbag after lowering the vehicle seat.

5 Claims, 6 Drawing Sheets

(51) Int. Cl.
 *B60R 21/00* (2006.01)
 *B60R 21/02* (2006.01)

(56) References Cited

U.S. PATENT DOCUMENTS

| | | | | |
|---|---|---|---|---|
| 5,496,061 | A * | 3/1996 | Brown | B60R 21/207 280/730.2 |
| 6,158,812 | A * | 12/2000 | Bonke | B60N 2/4805 297/216.12 |
| 6,582,015 | B2 * | 6/2003 | Jessup | B60N 2/4221 296/68.1 |
| 6,755,273 | B2 * | 6/2004 | Breed | B60N 2/002 180/274 |
| 8,985,622 | B1 * | 3/2015 | Cannon | B60N 2/4882 280/730.2 |
| 9,156,426 | B1 * | 10/2015 | Faruque | B60R 21/207 |
| 2002/0021041 | A1 * | 2/2002 | Jessup | B60N 2/4221 297/468 |
| 2005/0127645 | A1 * | 6/2005 | Smith | B60N 2/015 280/730.2 |
| 2010/0237596 | A1 * | 9/2010 | Sugimoto | B60R 21/207 280/743.1 |
| 2013/0015642 | A1 * | 1/2013 | Islam | B60R 21/207 280/730.1 |
| 2013/0093224 | A1 * | 4/2013 | Dainese | B60R 21/207 297/216.12 |
| 2014/0042733 | A1 * | 2/2014 | Fukawatase | B60R 21/23138 280/730.2 |
| 2014/0300088 | A1 * | 10/2014 | Fukawatase | B60R 21/13 280/729 |
| 2014/0327234 | A1 * | 11/2014 | Heurlin | B60R 21/207 280/730.1 |
| 2016/0082915 | A1 * | 3/2016 | Madaras | B60R 21/231 297/216.2 |
| 2016/0121839 | A1 * | 5/2016 | Ko | B60R 21/233 280/730.1 |

* cited by examiner

OCCUPANT PROTECTION DEVICE

CROSS-REFERENCE TO RELATED APPLICATION

This application claims priority under 35 USC 119 from Japanese Patent application No. 2015-139494 filed on Jul. 13, 2015, the disclosure of which is incorporated by reference herein.

BACKGROUND

Technical Field

The present disclosure relates to an occupant protection device.

Related Art

Airbag devices are known in which gas from an inflator is supplied through a gas supply pipe fixed to a seatback to a bag attached to the gas supply pipe, and the bag is inflated so as to cover an occupant from the front and the side (see Japanese Patent Application Laid-Open (JP-A) No. 2000-344044). Airbag devices are also known in which head airbags protrude out from left and right end portions of a seat headrest toward the front, and join up in front of the head of an occupant, and an auxiliary head airbag protrudes out from a central portion of the headrest and joins up with the pair of head airbags (see JP-A No. 2013-018378).

In the configuration of JP-A No. 2000-344044, the gas supply pipe extends out further to a vehicle upper side than a headrest, resulting in a narrow gap to a ceiling section of the vehicle, thus limiting the height of the vehicle seat. In the configuration of JP-A No. 2103-018378, it is difficult to secure the joint strength of the pair of head airbags that join up after inflating and deploying, and the joint strength of the auxiliary head airbag to the pair of head airbags.

As a countermeasure, a configuration may be considered in which an airbag housed in the headrest of a vehicle seat is inflated and deployed so as to cover the head of the occupant from the seat forward direction and from both left and right sides. However, since it is necessary to inflate and deploy the airbag so as to pass above the head of the occupant, if a gap between the headrest and the ceiling section is narrow, the airbag might strongly impinge on the ceiling section, affecting the deployment performance of the airbag.

SUMMARY

The present disclosure obtains an occupant protection device capable of suppressing an airbag that is housed in a headrest from strongly impinging on a vehicle ceiling section during inflation and deployment of the airbag.

A first aspect of the present disclosure is an occupant protection device including (1) an airbag that covers the head of the occupant, and that is configured as an integral bag body including (i) a front deployment section that is housed in a headrest of a vehicle seat, that is inflated and deployed on receipt of a supply of gas, and that is deployed at a seat forward direction with respect to the head of an occupant, and (ii) a pair of left and right lateral deployment sections that are connected to the front deployment section and that are inflated and deployed at seat sides with respect to the head of the occupant, (2) a lifting mechanism that raises and lowers the vehicle seat, and (3) a controller that uses the lifting mechanism to lower the vehicle seat to an airbag deployable height in cases in which a vehicle collision has been determined to be unavoidable based on a signal from a collision prediction sensor and a height of the vehicle seat is higher than the airbag deployable height, and that inflates and deploys the airbag after lowering the vehicle seat.

In the first aspect, the airbag is housed in the headrest of the vehicle seat. The airbag is inflated and deployed from the headrest on receipt of a supply of gas. The airbag is configured as an integral bag body including the front deployment section and the pair of left and right lateral deployment sections, and covers the head of the occupant. Movement of the occupant is limited (the occupant is restrained) by the airbag in various collision modes, thereby protecting the occupant.

The lifting mechanism provided to raise and lower the vehicle seat is configured so as to enable adjustment of the height of the vehicle seat according to the seated height of the occupant. The lifting mechanism is actuated in cases in which the controller has determined a vehicle collision to be unavoidable based on a signal from the collision prediction sensor and the vehicle seat is higher than the airbag deployable height. Actuating the lifting mechanism lowers the vehicle seat to the airbag deployable height. This thereby enables a gap enabling inflation and deployment of the airbag of the present disclosure between the headrest and a ceiling section to be secured. Since the controller inflates and deploys the airbag after lowering the vehicle seat, the airbag can be suppressed from strongly impinging on the ceiling section during inflation and deployment of the airbag. Note that the "airbag deployable height" referred to here is a height at which the airbag does not strongly impinge on the ceiling section of the vehicle during inflation and deployment, and is a concept encompassing contact with (impinging on) the ceiling section within a range that does not affect deployment performance airbag during the inflation and deployment process.

As described above, the first aspect enables impinging on the ceiling section of the vehicle to be suppressed during inflation and deployment of the airbag that is housed in the headrest.

A second aspect of the present disclosure is the occupant protection device of the first aspect, wherein the controller inflates and deploys the airbag without lowering the vehicle seat in cases in which a vehicle collision has been determined to be unavoidable based on a signal from the collision prediction sensor and the height of the vehicle seat is positioned at the airbag deployable height.

In the second aspect, the airbag is inflated and deployed without lowering the vehicle seat in cases in which the vehicle seat is positioned at the airbag deployable height. This thereby enables the airbag to be inflated and deployed earlier than in cases in which the airbag is inflated and deployed after lowering the vehicle seat.

The second aspect enables occupant protection performance to be improved in cases in which the height of the vehicle seat is already as low as the airbag deployable height.

A third aspect of the present disclosure is occupant protection device of either the first aspect or the second aspect, wherein the lifting mechanism includes a motor that raises and lowers the vehicle seat, and the controller drives the motor to lower the vehicle seat to the airbag deployable height.

In the third aspect, the motor that raises and lowers the vehicle seat due to occupant operation or the like doubles as the motor that lowers the vehicle seat on a signal from the controller in cases in which a vehicle collision has been determined to be unavoidable. There is accordingly no need to separately provide a dedicated actuator or the like to lower the vehicle seat to the airbag deployable height.

The third aspect enables space to be saved.

A fourth aspect of the present disclosure is the occupant protection device of any one of the first aspect to the third aspect, wherein the controller increases tension in a belt that restrains the occupant after a vehicle collision has been predicted based on a signal from the collision prediction sensor.

In the fourth aspect, tension in the belt is increased on a signal from the controller at the point at which a collision is predicted. This thereby enables the vehicle seat to be lowered in a state in which the occupant restraint force has been raised if a collision has been determined to be unavoidable and the vehicle seat is lowered. This thereby enables the head of the occupant to be suppressed from moving by a large amount toward the seat forward direction.

The fourth aspect enables a good occupant restraint state to be maintained when lowering the vehicle seat, and enables the airbag to be inflated and deployed smoothly.

A fifth aspect of the present disclosure is the occupant protection device of any one of the first aspect to the fourth aspect, wherein the headrest is attached to a seatback so as to be capable of moving in a seat vertical direction, and the controller inflates and deploys the airbag after lowering the vehicle seat to a lowermost step position and moving the headrest in a seat upward direction with respect to the seatback.

In the fifth aspect, a gap between the headrest and the ceiling section is widened by lowering the vehicle seat to the lowermost step position. In this state, the headrest is moved in the seat upward direction, after which the airbag housed in the headrest is inflated and deployed, thereby enabling the airbag to be suppressed from impinging on the head of the occupant during the inflation and deployment process. Further, moving the headrest in the seat upward direction enables the airbag to be deployed from a high position. Accordingly, there is no need to deploy the airbag in the seat upward direction, thereby enabling the airbag to be suppressed from strongly impinging on the ceiling section.

The fifth aspect facilitates inflation and deployment of the airbag so as to pass above the head of the occupant.

BRIEF DESCRIPTION OF THE DRAWINGS

Exemplary embodiments of the present disclosure will be described in detail based on the following figures, wherein.

DETAILED DESCRIPTION

Figure 1:
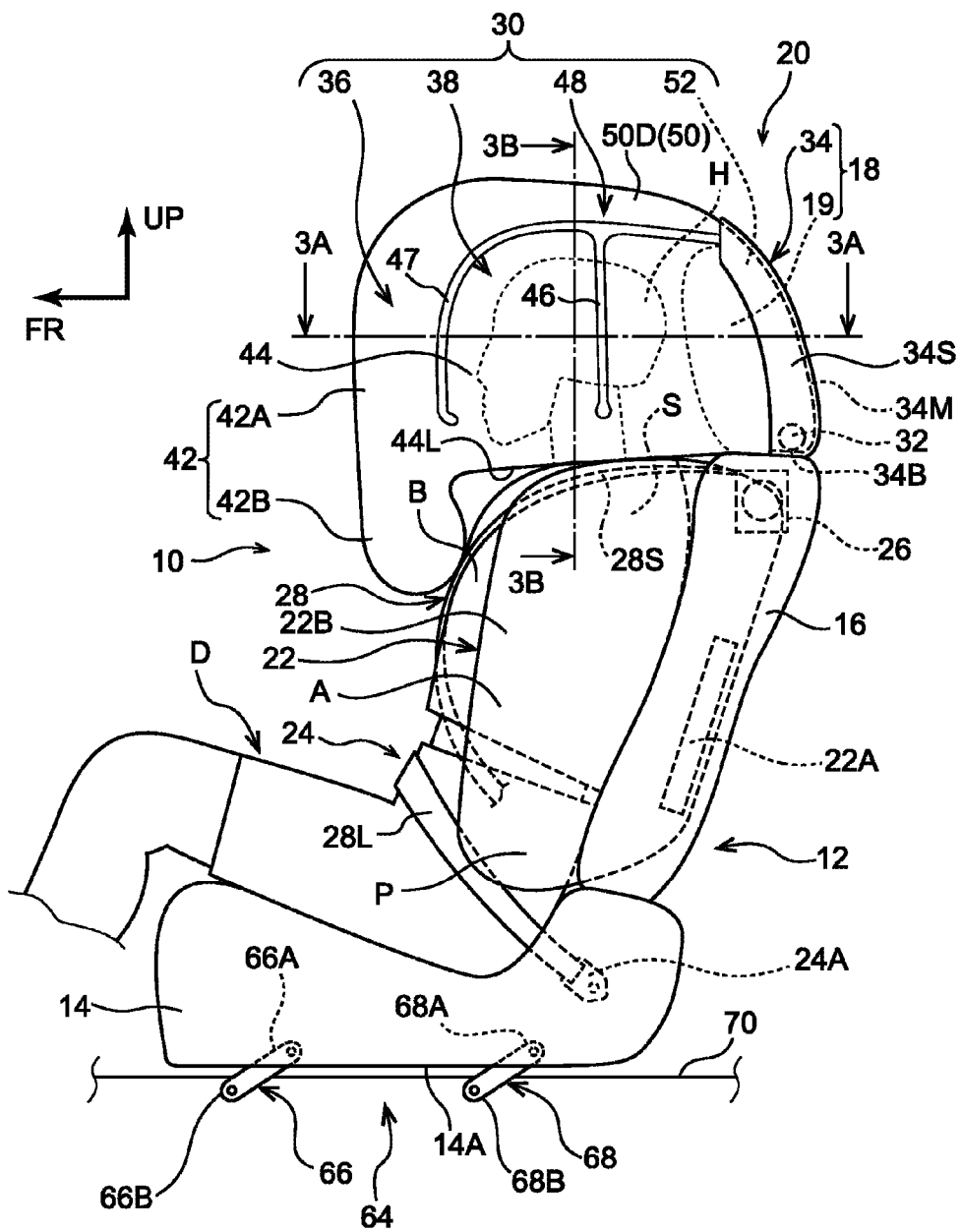
FIG. 1 is a side view schematically illustrating a protection mode of a seated occupant by an occupant protection device according to an exemplary embodiment of the present disclosure.

Explanation follows regarding an occupant protection device 10 according to an exemplary embodiment of the present disclosure, with reference to FIG. 1 to FIG. 5. Note that in the drawings, the arrow FR and the arrow UP respectively indicate a front direction (the direction in which a seated occupant faces) and an upward direction of a vehicle seat 12 as appropriate. In the following explanation, unless specifically indicated, reference simply to the front and rear, up and down, and left and right directions indicates the front and rear in a seat front-rear direction, up and down in a seat vertical direction, and left and right as facing forward in the seat front-rear direction. In the drawings, the arrow IN indicates a vehicle width direction central side as appropriate in an automobile, serving as a vehicle, installed with the vehicle seat 12.

Schematic Overall Configuration of Occupant Protection Device

Figure 2:
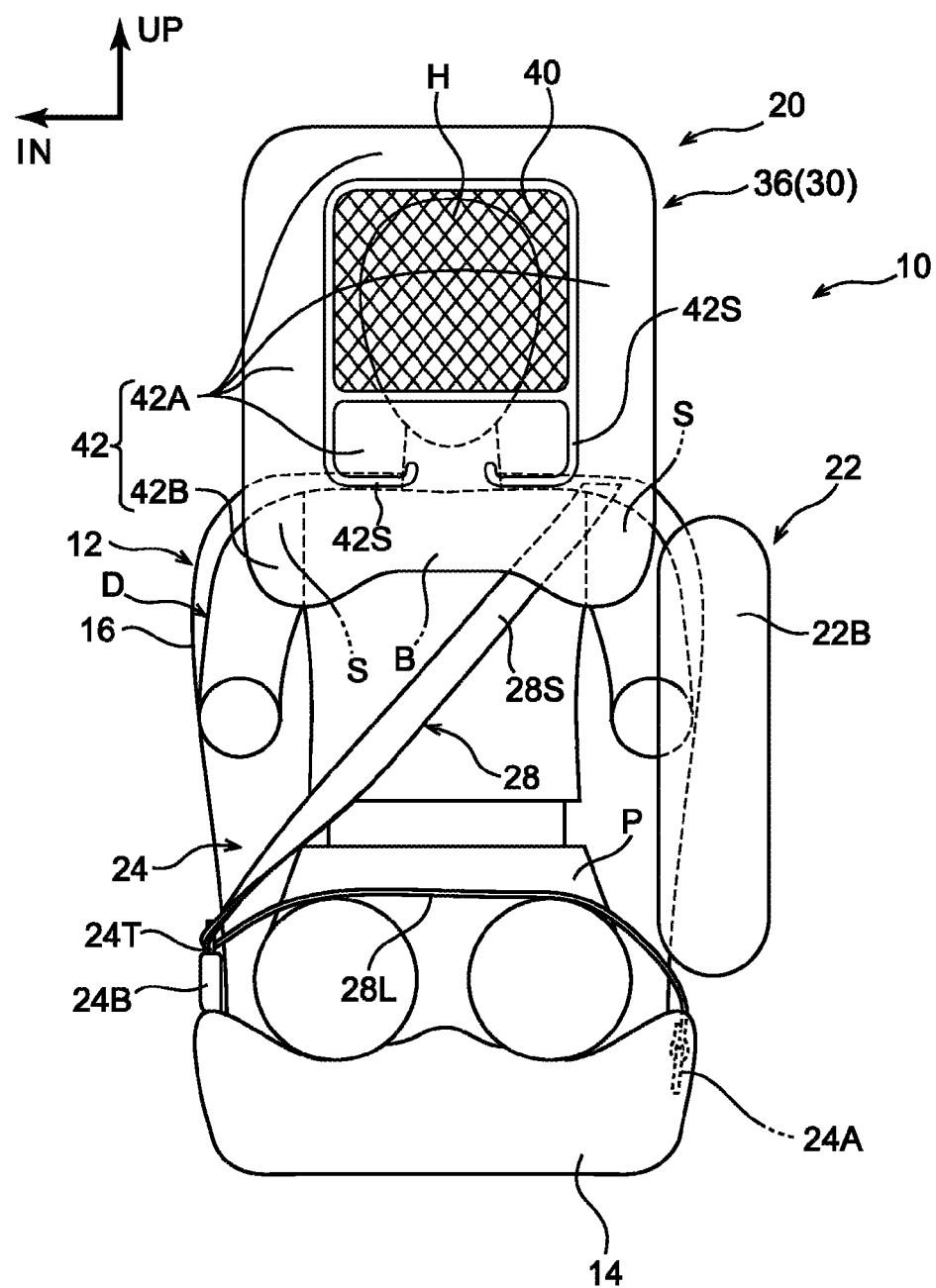
FIG. 2 is a front view schematically illustrating a protection mode of a seated occupant by an occupant protection device according to an exemplary embodiment of the present disclosure.

As illustrated in FIG. 1 and FIG. 2, the occupant protection device 10 is installed to the vehicle seat 12. The vehicle seat 12 is disposed offset to either the left or the right with respect to a vehicle width direction center of a vehicle body of an automobile, not illustrated in the drawings (on the left side in the present exemplary embodiment). In the present exemplary embodiment, the seat front-rear direction of the vehicle seat 12 corresponds to a front-rear direction of the vehicle, and a seat width direction corresponds to a vehicle width direction. The vehicle seat 12 is configured including a seat cushion 14, a seatback 16 of which a lower end is coupled to a rear end of the seat cushion 14, and a headrest 18 provided at an upper end of the seatback 16.

The respective drawings illustrate a crash test dummy (doll) D, serving as a model of an occupant to be protected, in a seated state on a seat cushion 14 of the vehicle seat 12. The dummy D is, for example, a World Side Impact Dummy (World SID) of a 50th percentile American adult male (AM50). The dummy D is seated in a standard seated posture specified in crash testing methods, and the vehicle seat 12 is positioned in a reference setting position corresponding to the seated posture. In the interests of simplicity of explanation, the dummy D is hereafter referred to as the "seated occupant D".

The occupant protection device 10 is configured including a multidirectional airbag device 20 for protecting the seated occupant D in various collision modes, a side airbag device 22, a seatbelt device 24, a lifting mechanism 64, and an Electronic Control Unit (ECU) 60, serving as a controller. Schematic configurations of the seatbelt device 24, the side airbag device 22, and the multidirectional airbag device 20 are described below, following which explanation is given regarding details of the configuration of the lifting mechanism 64 and the ECU 60.

The seatbelt device 24 is a three-point type seatbelt device, in which a belt (webbing) 28 is taken up on a retractor 26 from one end so as to be capable of being pulled out, and the other end of the belt 28 is fixed to an anchor 24A. The belt 28 is provided with a slidable tongue plate 24T, and the belt 28 is worn by the seated occupant D by anchoring the tongue plate 24T to a buckle 24B. In a state in which the belt 28 is being worn by the seated occupant D, a shoulder belt 28S spanning from the retractor 26 to the tongue plate 24T is worn over the upper body of the seated occupant D, and a lap belt 28L from the tongue plate 24T to the anchor 24A is worn over the waist P of the seated occupant D.

In the present exemplary embodiment, the seatbelt device 24 is configured as what is referred to as a seat-attached seatbelt device in which the retractor 26, the anchor 24A, and the buckle 24B are provided at the vehicle seat 12. Moreover, in the present exemplary embodiment, the retractor 26 includes a pre-tensioner function that forcibly takes up the belt 28 when actuated. The pre-tensioner function of the retractor 26 is actuated by the ECU 60, described later. In the present exemplary embodiment, the seatbelt device 24 is moreover configured as what is referred to as pre-crash seatbelt that uses a motor to increase the tension with which the belt 28 restrains the seated occupant D after a vehicle collision has been predicted by a collision prediction sensor 62, described later.

The side airbag device 22 is configured including an inflator 22A, and a side airbag 22B. The side airbag device 22 is housed in a side section on the vehicle width direction outside of the seatback 16, with the side airbag 22B in a folded state. On actuation, the inflator 22A generates gas inside the side airbag 22B. Configuration is made such that this gas causes the side airbag 22B to protrude out from the side section of the seatback 16 toward the front, and inflate and deploy to the vehicle width direction outside of the seated occupant D. In the present exemplary embodiment, the side airbag 22B is configured to inflate and deploy at the vehicle width direction outside of the waist P, abdomen A, chest B, and shoulder S of the seated occupant D.

Multidirectional Airbag Device Configuration

As illustrated in FIG. 1, the multidirectional airbag device 20 includes a multidirectional airbag 30, serving as an airbag, an inflator 32, and a module case (also referred to as an airbag case) 34 configuring the headrest 18. The multidirectional airbag 30 is housed inside the module case 34 in a folded state connected to the inflator 32 so as to be capable of being supplied with gas. The multidirectional airbag device 20 that is configured in a module in this manner is provided in the headrest 18, above the seatback 16. Specific explanation follows thereof.

Multidirectional Airbag

As illustrated in plan view cross-section in FIG. 3A, the multidirectional airbag 30 is configured by an integral bag body that inflates and deploys so as to cover the head H of the seated occupant D (also referred to below as simply the "head H") from the front and from both left and right sides. More specifically, as illustrated in FIG. 1 to FIG. 3B, the multidirectional airbag 30 is configured including a front deployment section 36 that deploys in front of the head H, and a pair of lateral deployment sections 38 that deploy on both the left and right sides of the head H.

The front deployment section 36 is configured including a mesh portion 40, serving as a see-through structure, that deploys in front of the head H, and a front inflating portion 42 that inflates and deploys surrounding the mesh portion 40 as viewed from the front. The mesh portion 40 is formed in a substantially rectangular shape as viewed from the front, and inner peripheral edges of the front inflating portion 42 form the shape of a rectangular frame that is joined to the mesh portion 40. The front inflating portion 42 inflates and deploys on receipt of a supply of gas.

As illustrated in FIG. 2, on the front inflating portion 42, a part mainly above the seatback 16 and surrounding the mesh portion 40 configures a first inflating portion 42A that inflates and deploys in front of the head H. A portion of the front inflating portion 42 positioned below the first inflating portion 42A (overlapping with the seatback 16 as viewed from the front) configures a second inflating portion 42B that inflates and deploys in front of the chest B and the shoulders S of the seated occupant D, and that serves as an upper body restraint portion. The second inflating portion 42B is supplied with gas through the first inflating portion 42A. In the present exemplary embodiment, a portion of the first inflating portion 42A positioned below the mesh portion 40 is partitioned from other portions of the first inflating portion 42A by a seam 42S, and is supplied with gas through the second inflating portion 42B.

The lateral deployment sections 38 are each configured including a lateral inflating portion 44 that inflates and deploys to the side of the head H on receipt of a supply of gas, and a seam portion 46, serving as a non-inflating portion, that extends along the vertical direction so as to partition the lateral inflating portion 44 into front and rear. As illustrated in FIG. 1, each lateral inflating portion 44 has a size (surface area) that overlaps the entire head H, as viewed from the side, and the seam portion 46 partitions the lateral inflating portion 44 into front and rear at a portion of the lateral inflating portion 44 overlapping with the head H.

Front ends of the left and right lateral inflating portions 44 are respectively connected in a communicated state with corresponding left and right lower ends of the first inflating portion 42A of the front inflating portion 42 (in the vicinity of a boundary with the second inflating portion 42B). The left and right lateral inflating portions 44 are thereby supplied with gas from the inflator 32 through the front inflating portion 42. Seam portions 47, serving as non-inflating portions, separate between the first inflating portion 42A of the front inflating portion 42 and the lateral inflating portions 44 at portions above the communicated portions mentioned above.

In an inflated and deployed state of the multidirectional airbag 30, lower ends 44L of the respective lateral inflating portions 44 of the left and right lateral deployment sections 38 make contact with the shoulders S of the seated occupant D. The contact between the lower ends 44L of the lateral inflating portions 44 and the shoulders S positions the multidirectional airbag 30 in the vertical direction with respect to (the head H of) the seated occupant in the inflated and deployed state.

In this positioned state, the multidirectional airbag 30 is configured such that none out of the front deployment section 36, the left and right lateral deployment sections 38, nor an upper deployment section 48, described later, contact the head H of the seated occupant D (forming gaps) in a normal seated posture.

The multidirectional airbag 30 includes the upper deployment section 48 that is connected to respective upper edges of the front deployment section 36 and the left and right lateral deployment sections 38, and that inflates and deploys above the head H of the seated occupant D. A main section of the upper deployment section 48 is configured by an upper inflating portion 50 that inflates and deploys on receipt of a supply of gas. The upper inflating portion 50 is configured including a central inflating portion 50C that inflates and deploys above the head H, and a pair of upper duct portions 50D, serving as duct portions, that extend along the front-rear direction to the left and right of the central inflating portion 50C.

The multidirectional airbag 30 includes a rear deployment section 52 that deploys to the rear of the upper deployment section 48. The rear deployment section 52 is configured including rear duct portions 54, these being inflating portions, and a non-inflating portion 56. The rear duct portions 54 are isolated from each other to the left and right, and upper ends thereof are respectively connected in a communicated state to the corresponding left and right upper duct portions 50D. The left and right rear duct portions 54 are coupled together by a non-inflating portion 56, a front edge of which is joined to a rear edge of the central inflating portion 50C.

The left and right rear duct portions 54 merge below the non-inflating portion 56 to form a gas entry portion, not illustrated in the drawings. The gas entry portion is connected so as to be capable of being supplied with gas from the inflator 32 through a T-shaped diffuser. Note that there is no limitation to a configuration employing a diffuser, and, for example, part of an upright inflator 32 that includes a gas outlet may be inserted into the gas entry portion. Moreover, the gas entry portion may be configured bent into an L-shape, and part of a horizontal inflator 32 that includes a gas outlet may be inserted into the gas entry portion.

As illustrated in FIG. 1, configuration is made such that in a non-restraining inflated and deployed state of the multidirectional airbag 30 in which the seated occupant D is not being restrained, as viewed from the side, the multidirectional airbag 30 is not superimposed with (does not overlap) the side airbag 22B that is in a non-restraining inflated and deployed state in which the seated occupant D is not being restrained. In other words, the multidirectional airbag 30 and the side airbag 22B are configured so as not to include inflating and deploying portions that overlap each other when both are in non-restraining inflated and deployed states, at least as viewed from the side. Moreover, as illustrated in FIG. 2, in the non-restraining inflated and deployed state, the multidirectional airbag 30 is configured so as not to be superimposed with the side airbag 22B in the non-restraining inflated and deployed state in which the seated occupant D is not restrained, as viewed from the front.

The multidirectional airbag 30 that inflates and deploys in the manner described above is laid out in an opened out shape (flat pattern) prior to folding. The multidirectional airbag 30 with this opened out shape is formed as a One Piece Woven (OPW) integral bag body. Note that the multidirectional airbag 30 may be formed into an integral bag body by a method of sewing together (cutting and sewing) peripheral edges of two pieces of woven material.

Inflator

A combustion type or cold gas type inflator is employed as the inflator 32, and gas generated on actuation is supplied inside the multidirectional airbag 30. In the present exemplary embodiment, the inflator 32 is configured by a cylinder type inflator, and is disposed inside the module case 34 with its length direction along the seat width direction. Actuation of the inflator 32 is controlled by the ECU 60, serving as a controller, described later.

Module Case

As illustrated in FIG. 1, the headrest 18 is configured including a headrest body 19, and a module case 34 disposed at a seat rear side of the headrest body 19. The headrest body 19 configures a seat front side of the headrest 18, and is disposed at the seat rear side of the head H of the seated occupant D. Moreover, in the present exemplary embodiment, the module case 34 is configured by a back board configuring (a rear portion design of) the headrest 18. The multidirectional airbag 30 is thereby housed inside a rear portion of the headrest 18.

The module case 34 projects out further upward than an upper end of the headrest body 19, as viewed from the front, and juts out toward both seat width direction sides of the headrest body 19. Namely, the module case 34 covers the headrest body 19 from the rear. In the present exemplary embodiment, the module case 34 covers a rear portion of the headrest body 19 from above and from both left and right sides, and configures a rear portion design of the headrest 18 as described above.

More specifically, as main portions, the module case 34 includes a base portion 34B, a main wall 34M, serving as a rear wall, and a pair of left and right side walls 34S. The base portion 34B configures a fixing portion to an upper end of the seatback 16.

The main wall 34M extends out upward from a rear end of the base portion 34B, and is tilted forward such that an upper end of the main wall 34M is positioned further toward the front than a lower end of the main wall 34M that is fixed to the seatback 16. As viewed from the side, the main wall 34M configures curved shape protruding upward and rearward. As viewed from the front, the main wall 34M projects out further upward than the upper end of the headrest body 19, and juts out to both seat width direction sides of the headrest body 19.

A space in which the multidirectional airbag 30 is housed in a folded state is formed between the main wall 34M and the headrest body 19. The upper end of the main wall 34M reaches above the headrest 18. Configuration is made such that the multidirectional airbag 30 passes between an upper end portion of the main wall 34M and the headrest 18 during an inflation and deployment process. In an inflated and deployed state of the multidirectional airbag 30, the rear deployment section 52 passes between the upper end portion of the main wall 34M and the headrest 18.

The pair of side walls 34S extend out from both seat width direction ends of the main wall 34M toward the front, and cover the rear portion of the headrest body 19, as viewed from the side. Configuration is made such that in the inflated and deployed state of the multidirectional airbag 30, (portions in the vicinity of boundaries with the rear deployment section 52 of) the lateral deployment sections 38 pass between the pair of side walls 34S and the headrest body 19.

The module case 34 described above houses the multidirectional airbag 30 in a folded state between the module case 34 and the headrest body 19. The inflator 32 is fastened to a seatback frame by a stud bolt together with the multidirectional airbag 30 and the base portion 34B of the module case 34.

The multidirectional airbag 30 is rolled up outward and housed inside the module case 34. Rolling up outward refers to a style of folding into a rolled-up shape from a front end side toward an upper side and rear side, so as to fold up in the opposite direction to that during the deployment process.

Inside the module case 34, a deployment guide cloth, not illustrated in the drawings, is folded and housed together with the multidirectional airbag 30. The deployment guide cloth is led out of the module case 34 accompanying inflation and deployment (unravelling of the rolling) of the multidirectional airbag 30, and the deployment guide cloth deploys ahead of the multidirectional airbag 30, between the multidirectional airbag 30 and a ceiling section 74. The deployment guide cloth has a smaller coefficient of friction with respect to the multidirectional airbag 30 than a ceiling material of the automobile installed with the occupant protection device 10. In the present exemplary embodiment, a face on the vehicle compartment ceiling side of the deployment guide cloth is silicone coated, and a face of the deployment guide cloth that contacts the multidirectional airbag 30 is configured as a low friction face that is not silicone coated.

Note that an airbag door, not illustrated in the drawings, closes off between the module case 34 and the headrest body 19. The airbag door is configured so as to split open about a tear line, this being a weakened portion, under inflation pressure of the multidirectional airbag 30, thereby allowing the multidirectional airbag 30 to inflate and deploy toward the front.

Lifting Mechanism Configuration

Figure 4:
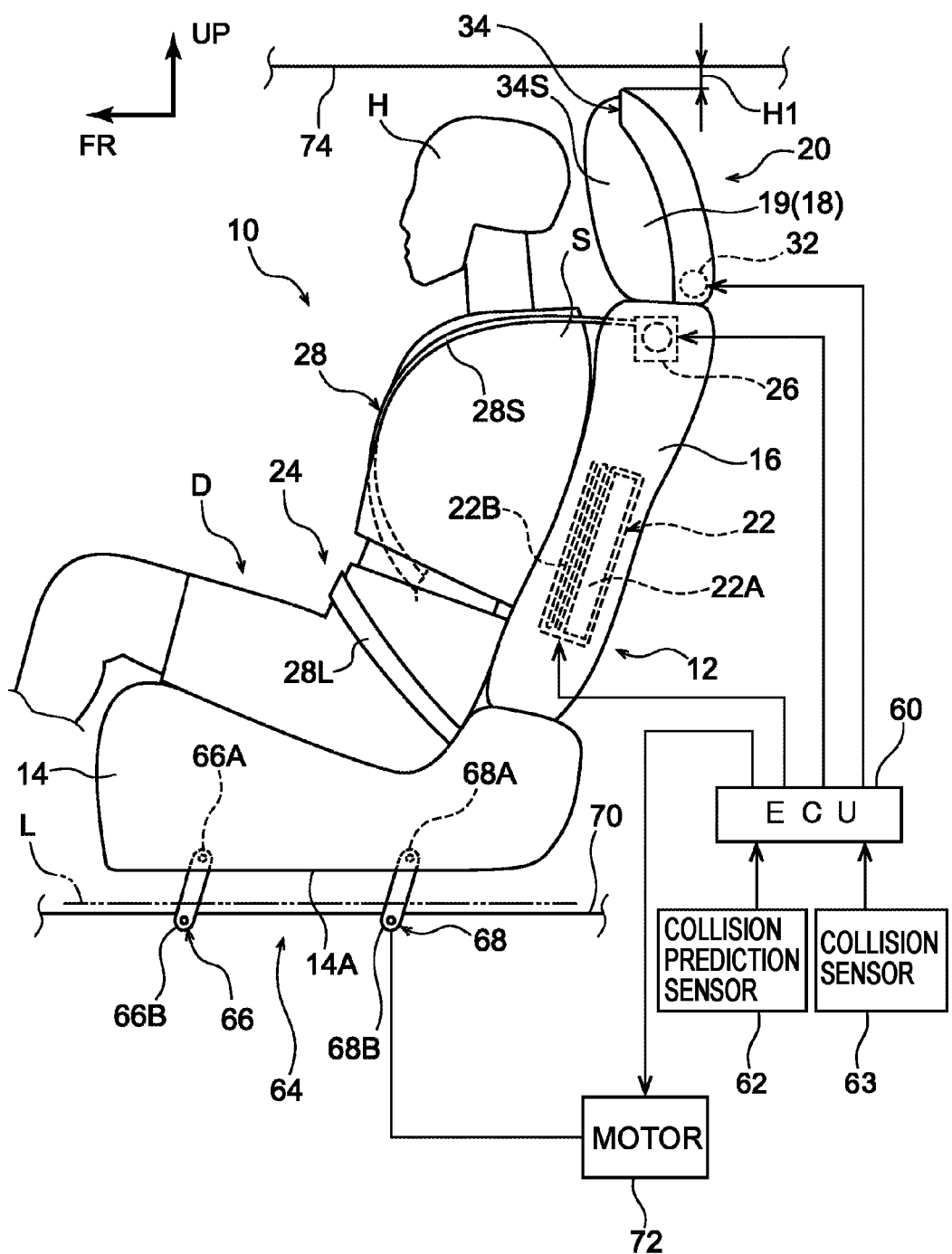
FIG. 4 is a side view illustrating a schematic overall configuration of an occupant protection device according to an exemplary embodiment of the present disclosure prior to actuation, illustrating a state in which the height of a vehicle seat is higher than a height at which an airbag is deployable.

The lifting mechanism 64 that raises and lowers the vehicle seat 12 is provided at a lower portion of the seat cushion 14. Specifically, as illustrated in FIG. 4, the lifting mechanism 64 is configured including front side links 66, rear side links 68, and a motor 72.

The front side links 66 are provided as a pair at a spacing in the seat width direction, and the front side links 66 couple a front portion of the seat cushion 14 to front portions of upper rails 70. More specifically, one end portions 66A of the front side links 66 are rotatably coupled to a front portion of a seat cushion frame, not illustrated in the drawings, configuring the seat cushion 14. Other end portions 66B of the front side links 66 are rotatably coupled to the front portions of the upper rails 70 through brackets or the like.

Note that the upper rails 70 are slidably attached to lower rails, not illustrated in the drawings, that are fixed to a vehicle floor. The upper rails 70 configure a slide mechanism together with the lower rails. Configuration is made such that sliding the upper rails 70 in the seat front-rear direction with respect to the lower rails enables the position of the vehicle seat 12 to be adjusted in the vehicle front-rear direction. Note that the slide mechanism is normally locked, and the upper rails 70 become capable of sliding with respect to the lower rails after this locking is released by occupant operation.

The rear side links 68 are provided further toward the rear of the seat than the front side links 66. The rear side links 68 are provided as a pair at a spacing in the seat width direction, and the rear side links 68 couple a rear portion of the seat cushion 14 to rear portions of the upper rails 70. More specifically, one end portions 68A of the rear side links 68 are rotatably coupled to a rear portion of the seat cushion frame. Other end portions 68B of the rear side links 68 are rotatably coupled to rear portions of the upper rails 70 through brackets or the like. A four-piece link is thus configured by the pair of front side links 66 and the pair of rear side links 68.

Note that gears, not illustrated in the drawings, are provided at the side of the other end portions 68B of the rear side links 68. Rotation shafts of the gears are coupled to the motor 72. Rotation force is thereby transmitted to the rear side links 68 by driving the motor 72. Rotating the front side links 66 and the rear side links 68 configuring the four-piece link enables the height of the seat cushion 14 (the vehicle seat 12) to be adjusted with respect to the vehicle floor. Actuation of the motor 72 is controlled by the ECU 60, serving as a controller, described later. Specifically, when the occupant operates an operation lever, not illustrated in the drawings, provided at a side portion of the vehicle seat 12 or the like, a signal is transmitted to the ECU 60, and the motor 72 is driven so as to raise or lower the vehicle seat 12.

Note that there is no limitation to driving the motor 72 only when the operation lever is being operated, and configuration may be made to drive the motor 72 for a specific number of rotations, so as to raise or lower the vehicle seat 12 by a predetermined height, each time the operation lever is operated.

ECU Configuration

The multidirectional airbag device 20, the side airbag device 22, the seatbelt device 24, and the lifting mechanism 64 configuring the occupant protection device 10 are controlled by the ECU 60, serving as a controller. Specifically, the inflator 32 of the multidirectional airbag device 20, the inflator 22A of the side airbag device 22, the retractor 26 of the seatbelt device 24, and the motor 72 of the lifting mechanism 64 are each electrically connected to the ECU 60. The ECU 60 is electrically connected to the collision prediction sensor 62, for example a pre-crash sensor, and a collision sensor 63 (or sensor group).

The ECU 60 is capable of predicting (the occurrence or inevitability of) various modes of frontal collision to the vehicle to which it is installed, by collision mode, described later, based on signals from the collision prediction sensor 62. The ECU 60 is capable of predicting (the occurrence or inevitability of) a side-on collision to the vehicle to which it is installed based on signals from the collision prediction sensor 62.

The ECU 60 increases the tension in the belt 28 of the seatbelt device 24 after a vehicle collision has been predicted based on a signal from the collision prediction sensor 62. Moreover, if a frontal collision has been determined to be unavoidable based on a signal from the collision prediction sensor 62, the ECU 60 drives the motor 72 of the lifting mechanism 64 to lower the vehicle seat 12 to an airbag deployable height. Immediately following this, the ECU 60 actuates a pre-tensioner mechanism of the retractor 26, and actuates the inflator 32, based on a signal from the collision sensor 63. In cases in which the height of the vehicle seat 12 is lower than an airbag deployment position, the retractor 26 and the inflator 32 are actuated without lowering the vehicle seat 12. Note that the frontal collision modes in which the ECU 60 actuates the retractor 26 and the inflator 32 are full overlap frontal collisions, offset frontal collisions and the like.

Here, the "airbag deployable height" refers to a height at which the inflating and deploying multidirectional airbag 30 does not strongly impinging on the ceiling section 74 of the vehicle during the inflation and deployment process of the multidirectional airbag 30. In the present exemplary embodiment, as illustrated in FIG. 4, an upper limit position L is set a predetermined height above the upper rails 70. In cases in which a lower end 14A of the seat cushion 14 is lower than the upper limit position L, the vehicle seat 12 is determined to be positioned at an airbag deployable height. Namely, in the case of FIG. 4, the lower end 14A of the seat cushion 14 is positioned above the upper limit position L, and so the vehicle seat 12 is determined to be higher than the airbag deployable height. Accordingly, if a side-on collision has been determined to be unavoidable based on a signal from the collision prediction sensor 62, the motor 72 of the lifting mechanism 64 is driven so as to lower the vehicle seat 12. Drive of the motor 72 is stopped after the lower end 14A of the seat cushion 14 has been lowered to the same height as the upper limit position L, or below the upper limit position L. Note that whether or not the airbag deployable height has been reached may be determined by detecting a rotation angle of the motor 72.

If, based on a signal from the collision prediction sensor 62, the ECU 60 has determined a frontal collision that is a frontal collision to a position offset by a predetermined value or greater toward one side in the vehicle width direction to be unavoidable, the ECU 60 drives the motor 72 of the lifting mechanism 64 to lower the vehicle seat 12 to the airbag deployable height. Immediately following this, the ECU 60 actuates the pre-tensioner mechanism of the retractor 26, and actuates the inflator 22A and the inflator 32 on detection of a frontal collision based on a signal from the collision sensor 63. However, the retractor 26, the inflator 22A, and the inflator 32 are actuated without lowering the vehicle seat 12 in cases in which the height of the vehicle seat 12 is already as low as the airbag deployable height. Such frontal collisions to a position offset by a predetermined value or greater toward one side in the vehicle width direction include oblique collisions, small overlap collisions, and the like.

If, based on a signal from the collision prediction sensor 62, the ECU 60 has determined a side-on collision to be unavoidable, the ECU 60 detects the height of the vehicle seat 12. In cases in which the height of the vehicle seat 12 is higher than the airbag deployable height, the ECU 60 drives the motor 72 of the lifting mechanism 64 to lower the vehicle seat 12 to the airbag deployable height. Immediately following this, the ECU 60 actuates the inflators 22A, 32 in detection of a side-on collision based on a signal from the collision sensor 63. However, the lifting mechanism 64 is not actuated in cases in which the height of the vehicle seat 12 is already as low as the airbag deployable height. Namely, the inflators 22A, 32 are actuated without lowering the vehicle seat 12.

Note that an oblique collision (MDB oblique collision) is, for example, defined by the NHTSA as a collision from the oblique front (as an example, a collision with a relative angle of 15° with the colliding party and with a vehicle width direction overlap amount in the region of 35%). In the present exemplary embodiment, as an example, an oblique collision at a relative speed of 90 km/h is envisaged. A small overlap collision is, for example, defined by the IIHS as a vehicle frontal collision in which a vehicle width direction overlap amount with the colliding party of 25% or lower. For example, a collision at the vehicle width direction outside of a front side member, this being a vehicle body frame, corresponds to a small overlap collision. In the present exemplary embodiment, as an example, a small overlap collision at a relative speed of 64 km/h is envisaged.

Operation

Next, explanation follows regarding operation of the present exemplary embodiment.

In the present exemplary embodiment, the lifting mechanism 64 is used to lower the vehicle seat 12 to the airbag deployable height prior to inflating and deploying the multidirectional airbag 30, thereby enabling a gap between the headrest 18 and the ceiling section 74 to be secured.

Figure 5:
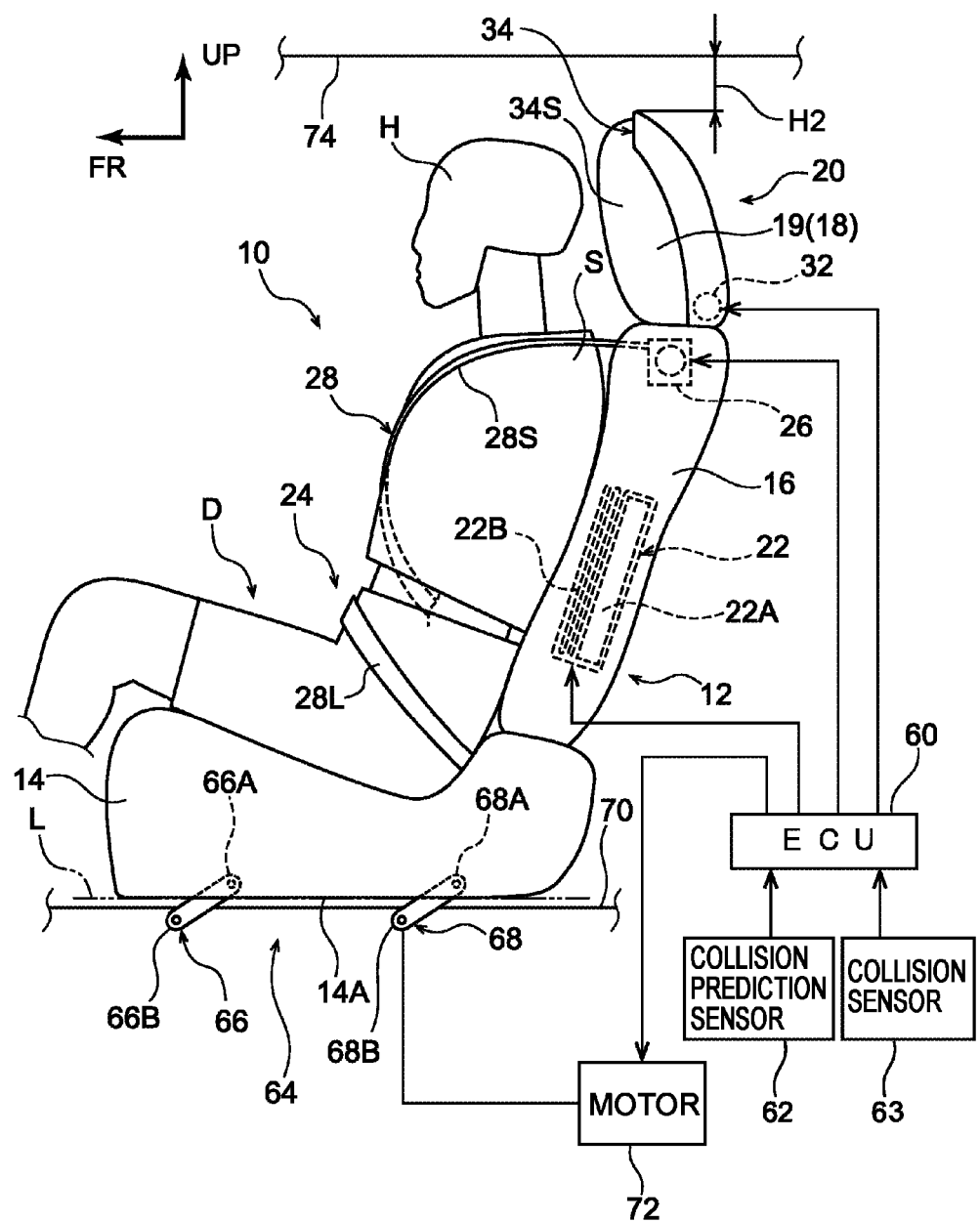
FIG. 5 is a side view corresponding to FIG. 4, illustrating a state in which the vehicle seat has been lowered to an airbag deployable height.

For example, as illustrated in FIG. 4, in cases in which the height of the vehicle seat 12 is higher than the airbag deployable height, a gap H1 between the headrest 18 and the ceiling section 74 is small, and there is a possibility that the multidirectional airbag 30 would strongly impinge on the ceiling section 74 were the inflator 32 to be actuated. However, in the present exemplary embodiment, after a vehicle collision has been determined to be unavoidable based on a signal from the collision prediction sensor 62, the ECU 60 actuates the lifting mechanism 64 to lower the vehicle seat 12 to the airbag deployable height. Accordingly, as illustrated in FIG. 5, a gap H2 between the headrest 18 and the ceiling section 74 becomes wider than the gap H1 in FIG. 4. As a result, the multidirectional airbag 30 can be suppressed from strongly impinging on the ceiling section 74 during inflation and deployment of the multidirectional airbag 30.

Moreover, in the present exemplary embodiment, after a vehicle collision has been determined to be unavoidable based on a signal from the collision prediction sensor 62, if the height of the vehicle seat 12 is positioned at the airbag deployable height, the ECU 60 actuates the inflator 32 without actuating the lifting mechanism 64. This thereby enables the multidirectional airbag 30 to be inflated and deployed earlier than in cases in which the multidirectional airbag 30 is inflated and deployed after moving the vehicle seat 12 to the airbag deployable height. Namely, this enables occupant protection performance to be improved in cases in which the height of the vehicle seat 12 is already as low as the airbag deployable height.

In the present exemplary embodiment, the ECU 60 drives the motor 72 of the lifting mechanism 64 to lower the vehicle seat 12. Namely, the same motor 72 is employed both when the vehicle seat 12 is raised or lowered by operation of the seated occupant D, and when the vehicle seat 12 is lowered when a vehicle collision has been determined to be unavoidable. There is accordingly no need to provide a separate dedicated actuator or the like to lower the vehicle seat 12 to the airbag deployable height, enabling space to be saved.

In the present exemplary embodiment, after a vehicle collision has been predicted based on a signal from the collision prediction sensor 62, the vehicle seat 12 can be lowered in a state in which the restraining force on the seated occupant D from the belt 28 has been raised. This thereby enables a good restrained state of the seated occupant D to be maintained while lowering the vehicle seat 12, and enables the multidirectional airbag 30 to be suppressed from impinging on the head H of the seated occupant D during inflation and deployment of the multidirectional airbag 30. In particular, due to raising the restraining force on the seated occupant D, the head H does not move by a large amount toward the seat front direction, and can be suppressed from strongly impinging on the front deployment section 36 of the multidirectional airbag 30.

In the present exemplary embodiment, the multidirectional airbag 30 housed in the headrest 18 can be inflated and deployed to effectively protect the seated occupant D against side collisions, frontal collisions, and oblique collisions (collisions from plural directions). The multidirectional airbag 30 is configured as an integral bag body that deploys such that the front deployment section 36 and the lateral deployment sections 38 cover the head H together with the upper deployment section 48 and the rear deployment section 52. Accordingly, in the multidirectional airbag 30, the respective deployment sections are firmly connected to each other, and load (reaction force) when restraining the head H, the chest B, and the shoulders S is supported by the vehicle seat 12. Accordingly, the multidirectional airbag 30 enables the occupant to be restrained with a greater restraining force than in configurations in which plural airbags (inflating portions) join together when restraining the occupant. Explanation follows regarding operation of the multidirectional airbag 30 in various collision modes.

Side-on Collisions

After the ECU 60 has detected or predicted a side-on collision based on a signal from the collision prediction sensor 62, the ECU 60 actuates the inflators 22A, 32. Accordingly, as illustrated in FIG. 1 and FIG. 2, the side airbag 22B of the side airbag device 22 is inflated and deployed at the vehicle width direction outside of the seated occupant D, and the multidirectional airbag 30 of the multidirectional airbag device 20 is inflated and deployed so as to cover the head H of the seated occupant D.

Nearside Side-on Collisions

After a side-on collision has occurred on the vehicle width direction side installed with the vehicle seat 12, movement of the upper body of the seated occupant D toward a side door side is limited by the side airbag 22B, and movement of the head H of the seated occupant D toward a side window glass side is limited by the lateral deployment section 38 on the vehicle width direction outside. Namely, the upper body and head H of the seated occupant D are restrained and protected against the side-on collision by the side airbag 22B and the lateral deployment section 38 on the vehicle width direction outside.

Namely, movement of the head H toward the collision side can be limited. Moreover, since the lateral deployment section 38 includes the lateral inflating portion 44, deformation of the lateral inflating portion 44 functions to absorb energy during the restraint process of the head H. For example, the peak load input to the head H can be kept small even when the head H moves as far as a side window glass.

Moreover, when the seated occupant D swings back after being protected by the side airbag 22B and the lateral deployment section 38 on the vehicle width direction outside, movement of the head H of the seated occupant D toward the collision-opposite side is limited by the lateral deployment section 38 on the vehicle width direction central side. For example, the head H of the seated occupant D is thereby suppressed from impinging on the seatback of an adjacent seat or an occupant in the adjacent seat.

Far-Side Side-on Collisions

On the other hand, if a side-on collision has occurred on the vehicle width direction opposite side to the side installed with the vehicle seat 12, movement of the head H of the seated occupant D toward the collision side (vehicle width direction central side) is limited by the lateral deployment section 38 on the vehicle width direction central side. Namely, the head H of the seated occupant D is restrained and protected against the side-on collision by the lateral deployment section 38 on the vehicle width direction central side.

Namely, movement of the head H toward the collision side can be limited. Moreover, since the lateral deployment section 38 includes the lateral inflating portion 44, deformation of the lateral inflating portion 44 functions to absorb energy during the restraint process of the head H. For example, the peak load input to the head H can be kept small even when the head H moves as far as a region where it might impinge on the seatback of the adjacent seat or an occupant in the adjacent seat.

Moreover, when the head H of the seated occupant D swings back after being protected by the lateral deployment section 38 on the vehicle width direction central side, movement of the seated occupant D toward the collision-opposite side is limited by the lateral deployment section 38 on the vehicle width direction outside, and by the side airbag 22B. For example, the head H of the seated occupant D is thereby suppressed from impinging on the side window glass.

Full Overlap or Offset Frontal Collisions

After the ECU 60 has predicted a full overlap frontal collision based on a signal from the collision prediction sensor 62, the ECU 60 actuates the retractor 26. The belt 28 of the seatbelt device 24 is thereby forcibly taken up by the retractor 26. The multidirectional airbag 30 of the multidirectional airbag device 20 then is inflated and deployed so as to cover the head H of the seated occupant D.

In a full overlap frontal collision, the seated occupant D moves straight toward the front under inertia. Note that the movement of the seated occupant D wearing the belt 28 of the seatbelt device 24 toward the front has a mode that tilts the upper body of the seated occupant D about the waist P. The head H of the seated occupant D contacts the front deployment section 36 of the multidirectional airbag 30 while being restrained by (receiving resistance to the forward movement from) the shoulder belt 28S, and movement of the head H toward the front is limited by the front deployment section 36. Moreover, the second inflating portion 42B of the front inflating portion 42 contacts the chest B and the shoulders S of the seated occupant D from the front, and movement of the upper body (head H) of the seated occupant D toward the front is limited by the second inflating portion 42B of the front inflating portion 42.

In this manner, the upper body and head H of the seated occupant D are restrained and protected against the full overlap frontal collision by the front deployment section 36. Namely, movement of the head H and the upper body of the seated occupant D toward the front can be limited. Moreover, since the front deployment section 36 includes the front inflating portion 42, deformation of the front inflating portion 42 functions to absorb energy during the restraint process of the head H, the chest B, and the shoulders S. For example, the peak load input to the head H can thereby be kept small, even when the head H moves as far as a region where it might impinge on vehicle configuration components (such as a steering wheel or instrument panel).

Explanation has been given regarding a case of a full overlap frontal collision; however, in a case of an offset collision in which, for example, a vehicle width direction overlap amount with another vehicle is in the region of 50%, substantially the same operation applies as in the full overlap frontal collision described above.

Oblique Collisions and Small Overlap Collisions

After the ECU 60 has detected or predicted an oblique collision based on a signal from the collision prediction sensor 62, the ECU 60 actuates the inflators 22A, 32, and the retractor 26. The belt 28 of the seatbelt device 24 is thereby forcibly taken up by the retractor 26, and the multidirectional airbag 30 of the multidirectional airbag device 20 is inflated and deployed so as to cover the head H of the seated occupant D. Moreover, the side airbag 22B of the side airbag device 22 is inflated and deployed at the vehicle width direction outside of the seated occupant D. Further explanation follows regarding the case of an oblique collision; however, a protection mode of the seated occupant D by the occupant protection device 10 in a small overlap collision is substantially the same as the protection mode of the seated occupant D by the occupant protection device 10 in an oblique collision.

Nearside Oblique Collisions

Figure 3A:
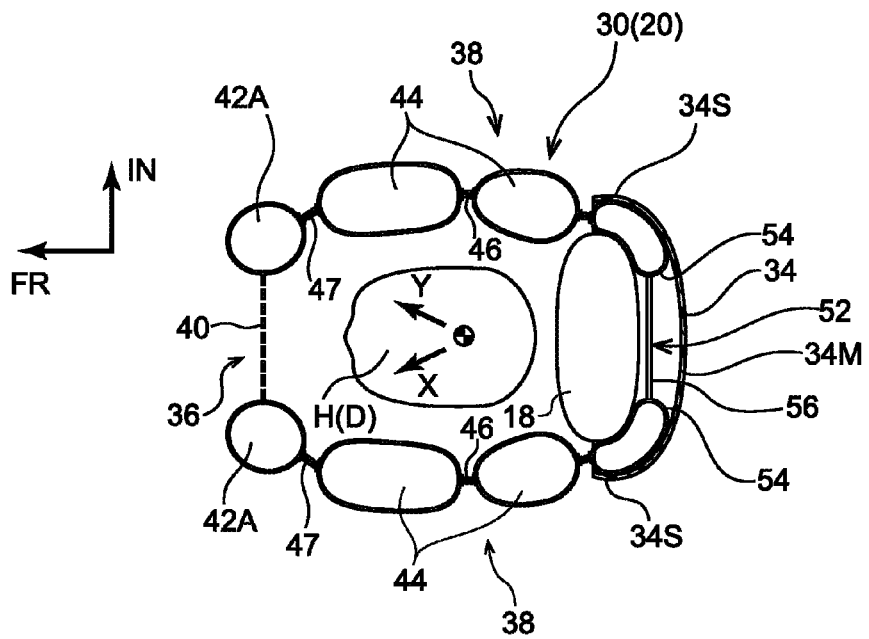
FIG. 3A is a cross-section taken along line 3A-3A in FIG. 1, illustrating an inflated and deployed state of a multidirectional airbag configuring an occupant protection device according to an exemplary embodiment of the present disclosure.
Figure 3B:
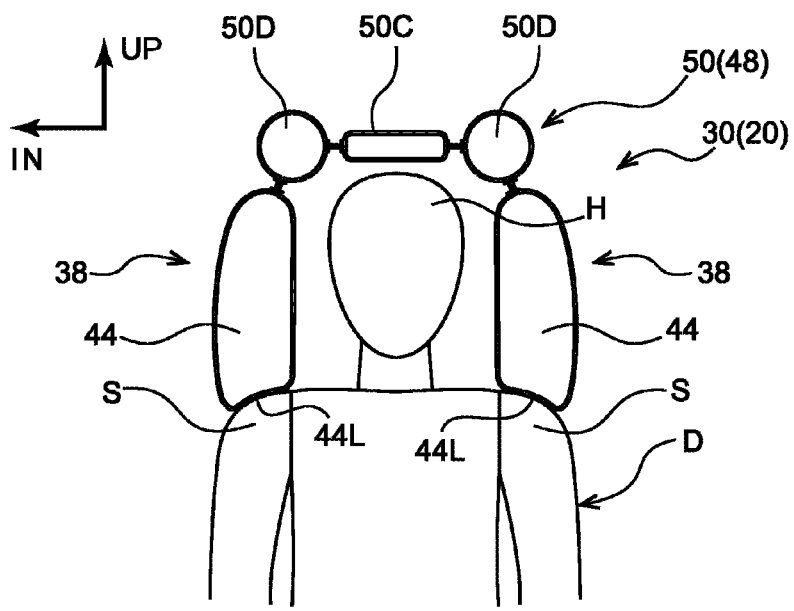
FIG. 3B is a cross-section taken along line 3B-3B in FIG. 1, illustrating an inflated and deployed state of a multidirectional airbag configuring an occupant protection device according to an exemplary embodiment of the present disclosure.

In an oblique collision on the vehicle width direction side installed with the vehicle seat 12, as illustrated by the arrow X in FIG. 3A, the seated occupant D moves toward the vehicle width direction outside, this being the vehicle width direction side of the collision to the vehicle body, while also moving toward the front. Again, in this case, movement of the seated occupant D wearing the three-point type seatbelt device has a mode that tilts forward about the waist P.

In this case, movement of the seated occupant D toward an oblique front collision side (front pillar side) is limited by the side airbag 22B, and by the front deployment section 36 and the vehicle width direction outside lateral deployment section 38 configuring the multidirectional airbag 30. Namely, the head H and the upper body of the nearside seated occupant D are restrained and protected against the oblique collision by the side airbag 22B, and by the front deployment section 36 and the vehicle width direction outside lateral deployment section 38 configuring the multidirectional airbag 30.

Namely, movement of the head H toward the oblique front collision side can be limited. Moreover, the front deployment section 36 and the lateral deployment section 38 on the vehicle width direction outside include the first inflating portion 42A and the lateral inflating portion 44 disposed across the seam portion 47. Accordingly, deformation of at least one of the first inflating portion 42A or the lateral inflating portion 44 functions to absorb energy during the restraint process of the head H and the like. For example, the peak load input to the head H can accordingly be kept small, even when the head H moves as far as a front pillar.

Far-Side Oblique Collisions and Small Overlap Collisions

In an oblique collision on the vehicle width direction opposite side to the side installed with the vehicle seat 12, as illustrated by the arrow Yin FIG. 3A, the seated occupant D moves toward the vehicle width direction central side, this being the vehicle width direction side of the collision to the vehicle body, while also moving toward the front. Again, in this case, movement of the seated occupant D wearing the three-point type seatbelt device 24 has a mode that tilts forward about the waist P.

In this case, movement of the seated occupant D toward an oblique front collision side (center cluster side) is limited by the front deployment section 36 and the vehicle width direction central side lateral deployment section 38 configuring the multidirectional airbag 30. Namely, the head H and the upper body of the seated occupant D are restrained and protected against the oblique collision by the front deployment section 36 and the vehicle width direction central side lateral deployment section 38 configuring the multidirectional airbag 30.

Namely, movement of the head H toward the oblique front collision side can be limited. Moreover, the front deployment section 36 and the lateral deployment section 38 on the vehicle width direction central side include the first inflating portion 42A and the lateral inflating portion 44 disposed across the seam portion 47. Accordingly, deformation of at least one of the first inflating portion 42A or the lateral inflating portion 44 functions to absorb energy during the restraint process of the head H and the like. For example, the peak load input to the head H can thereby be kept small, even when the head H moves as far as vehicle interior configuration components such as the instrument panel or the center cluster.

Other Operation

In the occupant protection device 10, the multidirectional airbag 30 is housed inside the module case 34 configuring the headrest 18. Accordingly, the occupant protection device 10 has a more pleasing appearance prior to actuation, while securing equivalent or superior occupant protection performance, than a configuration in which gas supply pipes disposed so as to surround the head of the occupant from above are always projecting out inside the vehicle compartment. Moreover, the occupant protection device 10 (in particular the multidirectional airbag device 20) does not hinder front-rear positional adjustment, height adjustment, reclining operation, or the like of the vehicle seat 12.

In the occupant protection device 10, in their non-restraining inflated and deployed states, the multidirectional airbag 30 and the side airbag 22B are not superimposed with each other, as viewed from the side. Accordingly, in collision modes in which both the multidirectional airbag 30 and the side airbag 22B are inflated and deployed, the multidirectional airbag 30 and the side airbag 22B inflate and deploy correctly, without strongly impinging on the inflation and deployment of each other. This thereby enables the head H of the seated occupant D to be restrained by the multidirectional airbag 30, and enables the seated occupant D to be restrained from the side over a range from the shoulders S to the waist P by the side airbag 22B.

In the multidirectional airbag device 20 configuring the occupant protection device 10, the lower ends 44L of the lateral inflating portions 44 configuring the lateral deployment sections 38 of the multidirectional airbag 30 contact the shoulders S of the seated occupant D, thereby positioning the multidirectional airbag 30 in the vertical direction with respect to the seated occupant D. For example, this thereby enables the multidirectional airbag 30 to be inflated and deployed at an appropriate position in the vertical direction, irrespective of individual differences in the physical frame or seated posture, within an appropriate range, of the seated occupant D. The restraint (movement limiting) performance of the occupant by the multidirectional airbag 30 is thereby improved.

Moreover, the multidirectional airbag 30 is configured by an integral bag body that covers the head H of the seated occupant D, and includes the lateral inflating portions 44 partitioned at the seam portions 46, and the front inflating portion 42 partitioned from the lateral inflating portions 44 at the seam portions 47. During the inflation and deployment process of the multidirectional airbag 30, the front inflating portion 42 (the first inflating portion 42A) is inflated and deployed first, after which the lateral inflating portions 44 are inflated and deployed.

Accordingly in the multidirectional airbag 30, first the front inflating portion 42 inflates and deploys and approaches the head H from the front, after which the left and right lateral inflating portions 44 approach the head H from both the left and right sides. In other words, in the multidirectional airbag 30, the front inflating portion 42 and the lateral inflating portions 44 gradually approach the head (gradually draw closer from an open state) due to the inflation and deployment of the respective inflating portions 42, 44 during the inflation and deployment process. The multidirectional airbag 30 is thereby suppressed from impinging on the head H during the deployment process, and approaches the head H after inflation and deployment has completed, thereby improving restraint (movement limiting) performance of the occupant by the multidirectional airbag 30.

In the multidirectional airbag 30, the front inflating portion 42 is supplied with gas through the upper duct portions 50D that are inflated and deployed above the head H of the seated occupant D, and the lateral inflating portions 44 are supplied with gas through the front inflating portion 42. This thereby enables a configuration in which the front inflating portion 42 is inflated and deployed ahead of the lateral inflating portions 44 to be achieved with a simple configuration.

The multidirectional airbag 30 is housed inside the module case 34 in a state rolled up outward. A portion where the multidirectional airbag 30 unravels during the inflation and deployment process is thereby positioned above the upper duct portions 50D. The multidirectional airbag 30 is accordingly easier to deploy in a mode passing above the head H of the seated occupant D while deploying toward the front accompanying the flow of gas into the upper duct portions 50D than in a configuration in which the unfolding portion is at a lower position, namely positioned at the side of the head H of the seated occupant D.

In the multidirectional airbag device 20, the module case 34 juts out upward and to both sides of the headrest body 19 in the vehicle width direction. The multidirectional airbag 30 can accordingly be deployed toward the front from the portions of the module case 34 that jut out with respect to the headrest body 19, as viewed from the front (gap portions between the module case 34 and the headrest body 19). This thereby enables inflation and deployment of the multidirectional airbag 30 to be completed in a shorter time than in a configuration provided with a multidirectional airbag that is deployed toward the front by wrapping around the headrest body 19 from the back face side only.

The main wall 34M of the module case 34 supports the multidirectional airbag 30 from the rear during the inflation and deployment process. Reaction force of the multidirectional airbag 30 is thereby supported from the rear by the main wall 34M accompanying inflation and deployment, and the multidirectional airbag 30 inflates and deploys toward the front without moving toward the rear. This thereby enables a more appropriate inflation and deployment mode (position, shape) of the multidirectional airbag 30 than in a configuration in which a main wall of the module case 34 does not include a support wall (function).

Moreover, the main wall 34M of the module case 34 configures curved shape protruding upward and rearward as viewed from the side, such that the upper end of the main wall 34M is positioned further forward than the lower end. Accordingly, while the multidirectional airbag 30, in a folded state at the rear of the headrest 18, heads upward inside the module case 34 during an initial stage of inflation and deployment, the multidirectional airbag 30 is guided upward and toward the front by the main wall 34M during deployment from the module case 34. Namely, during the inflation and deployment process, the multidirectional airbag 30 is guided upward and toward the front by the main wall 34M of the module case 34 so as to be deployed toward the front while passing above the head H of the seated occupant D. This thereby enables a more appropriate inflation and deployment mode (path) of the multidirectional airbag 30 than in a configuration in which the main wall 34M does not include a guide wall (function).

In the multidirectional airbag device 20, the front deployment section 36 of the multidirectional airbag 30 is provided with the mesh portion 40, serving as a see-through structure, in front of the head H of the seated occupant D. The seated occupant D is accordingly able to see an area (in the vehicle compartment and at the outside of the vehicle) at the front side of the front deployment section 36 through the mesh portion 40 in an inflated and deployed state of the multidirectional airbag 30 (during and after protection by the multidirectional airbag 30). Namely, a field of vision in front of the seated occupant D can be secured.

Other Modified Examples

Figure 6:
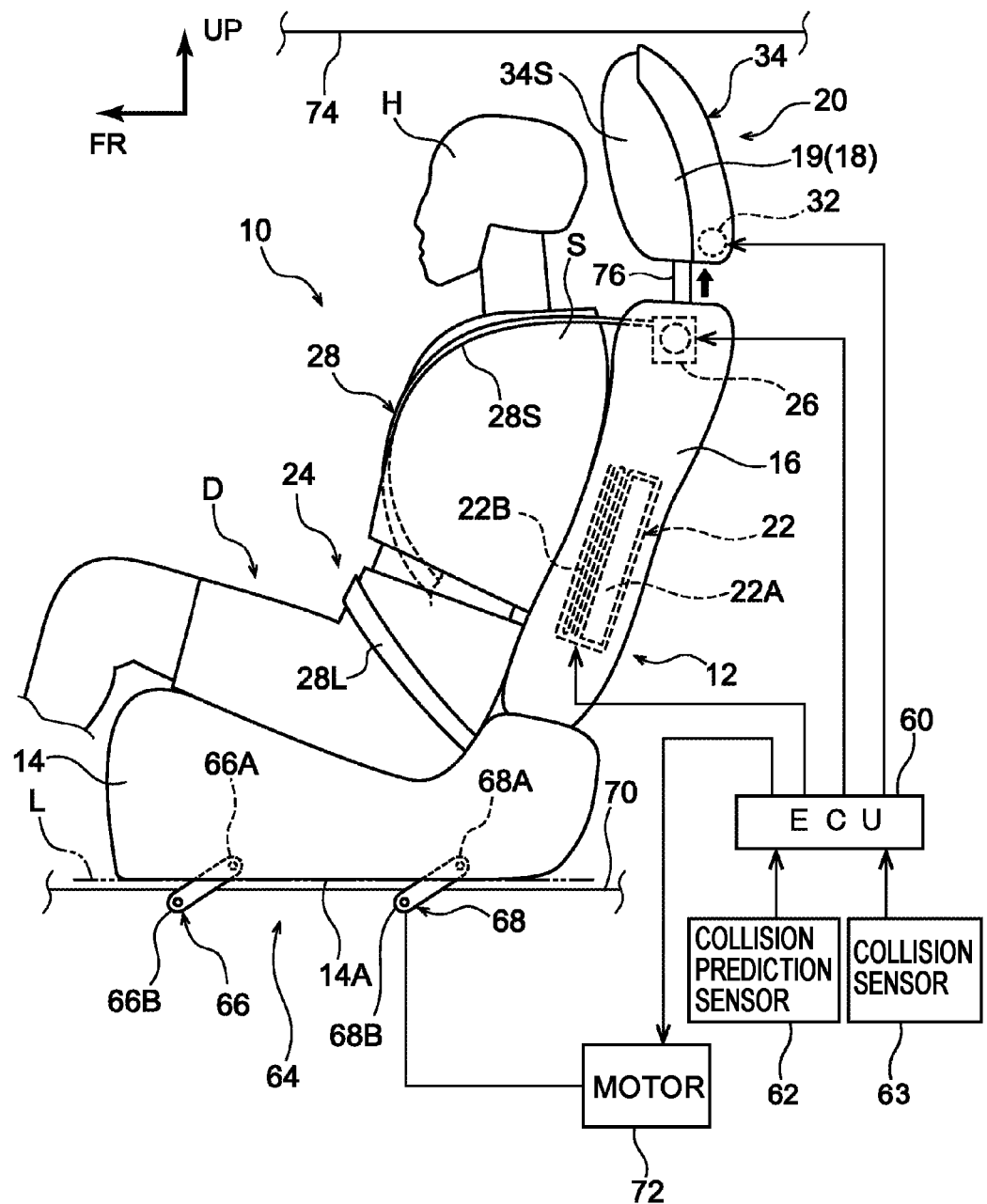
FIG. 6 is a side view corresponding to FIG. 5, illustrating a modified example of an occupant protection device according to an exemplary embodiment of the present disclosure.

Explanation has been given above regarding an exemplary embodiment of the present disclosure; however, the present disclosure is not limited to the above configuration, and obviously various specifications other than the configuration described above may be implemented within a range not departing from the spirit of the present disclosure. For example, as illustrated in FIG. 6, configuration may be made in which the headrest 18 is moved in the seat upward direction with respect to the seatback 16 prior to inflating and deploying the multidirectional airbag 30. In such cases, an actuator, not illustrated in the drawings, is installed inside the seatback 16, and after using the lifting mechanism 64 to lower the vehicle seat 12 to a lowermost step position, the actuator is used to slide headrest stays 76 in the seat upward direction, thereby moving the headrest 18 in the seat upward direction. Inflating and deploying the multidirectional airbag 30 after moving the headrest 18 enables easier inflation and deployment of the multidirectional airbag 30 so as to pass above the head H of the seated occupant D.

In the present exemplary embodiment, the same motor 72 is employed both in cases in which the vehicle seat 12 is raised or lowered by occupant operation, and in cases in which the vehicle seat 12 is lowered after a vehicle collision has been determined to be unavoidable. However, there is no limitation thereto, and an emergency motor may be provided separately to the motor 72. In such cases, if a clutch that enables power transmission to be cut off is provided between the motor 72 and the rear side links 68, the emergency motor may be driven to lower the vehicle seat 12 if the ECU 60 has received a signal from the collision prediction sensor 62. In such a configuration, installing an emergency motor capable of lowering the vehicle seat 12 more quickly than the motor 72 enables the time taken from the ECU 60 receiving a signal from the collision prediction sensor 62 until the multidirectional airbag 30 is inflated and deployed to be reduced.

Moreover, the emergency motor may be driven to lower the vehicle seat 12 further than when the normal motor 72 for adjusting the seat height is driven. Namely, configuration may be made such that when the vehicle seat 12 is lowered by the motor 72, the vehicle seat 12 cannot be lowered as far as the airbag deployable height, and when the emergency motor lowers the vehicle seat 12, the vehicle seat 12 is lowered to the airbag deployable height. In such cases, after a vehicle collision has been determined to be unavoidable based on a signal from the collision prediction sensor 62, the vehicle seat 12 is lowered irrespective of the height of the vehicle seat 12, thereby enabling simpler control.

In the present exemplary embodiment, the motor 72 is connected to the rear side links 68 of the lifting mechanism 64; however, the present disclosure is not limited thereto. For example, the motor 72 may be connected to the front side links 66, or the motor 72 may be connected to both the front side links 66 and the rear side links 68.

Moreover, in the present exemplary embodiment, the vehicle seat 12 is raised and lowered by the four-piece link configured by the pair of front side links 66 and the pair of rear side links 68. However, the present disclosure is not limited thereto. For example, a structure may be employed in which actuators are respectively provided at a front side and a rear side of the seat cushion 14, and the front side and the rear side are raised and lowered independently of each other.

In the present exemplary embodiment, an example has been given in which the occupant protection device 10 includes the side airbag device 22; however, the present disclosure is not limited thereto. For example, configuration may be made in which the occupant protection device 10 does not include the side airbag device 22. Moreover, in configurations in which the occupant protection device 10 does include the side airbag device 22, there is no limitation to a configuration in which the side airbag device 22 is provided at the vehicle seat 12. For example, the occupant protection device 10 may be configured such that a side airbag device is provided in a side door or the like. Moreover, in the present exemplary embodiment, an example has been given in which the occupant protection device 10 is provided with the side airbag device 22 on the vehicle width direction outside; however, the present disclosure is not limited thereto. For example, configuration may be made in which the occupant protection device 10 is provided with a side airbag device disposed on the vehicle width direction central side instead of, or in addition to, the side airbag device 22 on the vehicle width direction outside.

In the exemplary embodiment described above, an example has been given in which the occupant protection device 10 is provided with the seatbelt device 24; however, the present disclosure is not limited thereto. For example, configuration may be made in which the occupant protection device 10 is not provided with the seatbelt device 24. Moreover, in configurations in which the occupant protection device 10 does include the seatbelt device 24, there is no limitation to a configuration in which the seatbelt device 24 is provided at the vehicle seat 12. For example, configuration may be made in which the retractor, the anchor, the buckle, and the like are provided on a vehicle body side. Moreover, in configurations in which the occupant protection device 10 does include the seatbelt device 24, there is no limitation to a three-point type seatbelt device, and a four-point type or a two-point type seatbelt device may be employed. There is moreover no limitation to a pre-crash seatbelt. Namely, there is no limitation to a configuration in which tension in the belt 28 is increased when a vehicle collision has been predicted by the collision prediction sensor 62.

In the present exemplary embodiment, an example has been given in which the seat width direction of the vehicle seat 12 corresponds to the vehicle width direction. However, the present disclosure is not limited thereto. For example, the vehicle seat 12 may be disposed at an angle with respect to the vehicle body, or configuration may be made in which the direction of the vehicle seat 12 with respect to the vehicle body can be changed (rotated about a vertical axis). In such a configuration, configurations including the multidirectional airbag 30 that is inflated and deployed so as to cover the head H of the seated occupant D can contribute to good protection of the head H. Moreover, since the multidirectional airbag 30 is housed in the headrest 18 prior to inflating and deploying, the multidirectional airbag 30 is not liable to interfere with surfaces inside the vehicle compartment or vehicle interior configuration components, and is suppressed or prevented from hindering operations to change the direction of the vehicle seat 12 with respect to the vehicle body.

In the present exemplary embodiment, an example has been given in which the multidirectional airbag 30 is housed in the headrest 18. However, the present disclosure is not limited thereto, and configuration may be made in which the multidirectional airbag 30 is housed inside a vehicle seat with an integral headrest and seatback. In such cases, a part of the vehicle seat that supports the head of the occupant corresponds to the "headrest" of the present disclosure.

In the present exemplary embodiment, an example has been given in which the multidirectional airbag 30 is configured including the upper deployment section 48 and the rear deployment section 52; however, the present disclosure is not limited thereto. It is sufficient that the multidirectional airbag be configured including a front deployment section and left and right lateral deployment sections. Accordingly, for example, configuration may be made in which gas from an inflator is supplied to a front inflating portion of the front deployment section through a lateral inflating portion of one or both lateral deployment sections. Accordingly, the multidirectional airbag 30 is not limited to a configuration including an upper deployment section in which the upper deployment section includes the upper inflating portion 50 (upper duct portions 50D). Moreover, in a configuration in which a multidirectional airbag includes duct portions, there is no limitation to a configuration with a pair of left and right ducts. For example, a duct portion may be formed at only the seat width direction center, or a duct portion may be formed across the entire width of the upper deployment section.

In the present exemplary embodiment, an example has been given in which the front deployment section 36 and the lateral deployment sections 38 configuring the multidirectional airbag 30 respectively include the front inflating portion 42 and the lateral inflating portions 44. However, the present disclosure is not limited thereto. For example, configuration may be made in which any out of a front deployment section and left or right lateral deployment sections are not provided with inflating portions. Accordingly, a multidirectional airbag is not limited to a configuration in which a front inflating portion is inflated and deployed ahead of lateral inflating portions. Moreover, the second inflating portion 42B of the front inflating portion 42 is not limited to a configuration that restrains both the shoulders S and the chest B of the seated occupant D, and the second inflating portion 42B of the front inflating portion 42 may be configured so as to restrain either the shoulders S or the chest B.

In the present exemplary embodiment, an example has been given in which the multidirectional airbag 30 includes the seam portions 46, 47 serving as non-inflating portions; however, the present disclosure is not limited thereto. For example, an integral bag body may be configured in which a front deployment section and left and right lateral deployment sections do not include non-inflating portions. For example, a multidirectional airbag may also be configured without clear boundaries between a front deployment section (front inflating portion) and lateral deployment sections (lateral inflating portions). From this perspective, too, it may be said that the multidirectional airbag is not limited to a configuration in which a front inflating portion is inflated and deployed ahead of lateral deployment sections.

Moreover, in the present exemplary embodiment, an example has been given in which the front deployment section configuring the multidirectional airbag 30 includes the mesh portion 40; however, the present disclosure is not limited thereto. For example, configuration may be made in which a transparent sheet is provided as a see-through structure in place of the mesh portion 40, and configuration may be made without a see-through structure.

In the present exemplary embodiment, an example has been given in which the multidirectional airbag 30 is rolled up outward; however, the present disclosure is not limited thereto. For example, the multidirectional airbag 30 may be housed in the headrest 18, the seatback 16, or the like by employing another folding style, such as concertina folding.

What is claimed is:

1. An occupant protection device comprising:
   an airbag that is configured to cover a head of an occupant, and that is configured as an integral bag body including (i) a front deployment section that is housed in a headrest of a vehicle seat, that is inflated and deployed on receipt of a supply of gas, and that is deployed at a seat forward direction with respect to the head of the occupant, and (ii) a pair of left and right lateral deployment sections that are connected to the front deployment section and that are inflated and deployed at seat sides with respect to the head of the occupant;
   a lifting mechanism that raises and lowers the vehicle seat; and a controller that uses the lifting mechanism to lower the vehicle seat to an airbag deployable height in cases in which a vehicle collision has been determined to be unavoidable based on a signal from a collision prediction sensor and a height of the vehicle seat is higher than the airbag deployable height, and that inflates and deploys the airbag after lowering the vehicle seat.

2. The occupant protection device of claim 1, wherein the controller inflates and deploys the airbag without lowering the vehicle seat in cases in which a vehicle collision has been determined to be unavoidable based on a signal from the collision prediction sensor and the height of the vehicle seat is positioned at the airbag deployable height.

3. The occupant protection device of claim 1, wherein:
the lifting mechanism includes a motor that raises and lowers the vehicle seat; and
the controller drives the motor to lower the vehicle seat to the airbag deployable height.

4. The occupant protection device of claim 1, wherein the controller increases tension in a belt that restrains the occupant after a vehicle collision has been predicted based on a signal from the collision prediction sensor.

5. The occupant protection device of claim 1, wherein:
the headrest is attached to a seatback so as to be capable of moving in a seat vertical direction; and
the controller inflates and deploys the airbag after lowering the vehicle seat to a lowermost step position and moving the headrest in the seat vertical direction with respect to the seatback.

\* \* \* \* \*